(12) United States Patent
Garaev et al.

(10) Patent No.: US 11,972,241 B2
(45) Date of Patent: Apr. 30, 2024

(54) VALIDATION OF PAYLOAD FOR DEPLOYMENT TO A TARGET ENVIRONMENT

(71) Applicant: Microsoft Technology Licensing, LLC, Redmond, WA (US)

(72) Inventors: Dmitry Dmitrievich Garaev, Redmond, WA (US); Andrey Anatolyevich Lukyanov, Redmond, WA (US); Nicolae Voicu, Bellevue, WA (US)

(73) Assignee: Microsoft Technology Licensing, LLC., Redmond, WA (US)

( * ) Notice: Subject to any disclaimer, the term of this patent is extended or adjusted under 35 U.S.C. 154(b) by 431 days.

(21) Appl. No.: 17/186,990

(22) Filed: Feb. 26, 2021

(65) Prior Publication Data
US 2022/0276848 A1 Sep. 1, 2022

(51) Int. Cl.
G06F 9/44 (2018.01)
G06F 8/60 (2018.01)
H04L 9/32 (2006.01)
H04L 9/00 (2022.01)

(52) U.S. Cl.
CPC ............. G06F 8/60 (2013.01); H04L 9/3236 (2013.01); H04L 9/3247 (2013.01); H04L 9/3265 (2013.01); H04L 9/50 (2022.05)

(58) Field of Classification Search
CPC ........................................................ G06F 8/60
USPC ........................................................ 717/172
See application file for complete search history.

(56) References Cited

U.S. PATENT DOCUMENTS

| 9,665,366 | B2 | 5/2017 | Kuchibhotla et al. |
| 9,767,130 | B2* | 9/2017 | Bestler ............... G06F 16/1752 |
| 10,528,722 | B2 | 1/2020 | Gray |
| 10,574,465 | B2 | 2/2020 | Li et al. |
| 10,635,426 | B2 | 4/2020 | Rathinasabapathy et al. |
| 2015/0199188 | A1* | 7/2015 | Mantripragada ..... G06F 21/121 717/101 |
| 2021/0351934 | A1* | 11/2021 | Yang ..................... H04L 63/126 |
| 2022/0276848 | A1* | 9/2022 | Garaev ................. H04L 9/0894 |
| 2023/0208824 | A1* | 6/2023 | Gulati ..................... G09C 1/00 713/169 |

OTHER PUBLICATIONS

"Claims-based Identity", Retrieved From: https://en.wikipedia.org/w/index.php?title=Claims-based_identity&oldid=924337403, Nov. 3, 2019, 3 Pages.

(Continued)

*Primary Examiner* — Evral E Bodden
(74) *Attorney, Agent, or Firm* — Christopher J. Volkmann; Kelly, Holt & Christenson, PLLC.

(57) ABSTRACT

A payload is generated by a build computing system. The payload includes payload identifying metadata and deployment target identifier metadata, as well as an application container that includes a set of signed binaries. The payload can be approved for deployment, and a token can be generated for the payload. The token may include a set of claims that include payload identifying information. A payload validation system validates the payload for deployment to a target environment using the payload identifying information.

13 Claims, 7 Drawing Sheets

(56) References Cited

OTHER PUBLICATIONS

"Security Token Service", Retrieved From: https://en.wikipedia.org/wiki/Security_token_service, Mar. 30, 2018, 2 Pages.

"International Search Report and Written Opinion Issued in PCT Application No. PCT/US22/016906", dated May 18, 2022, 14 Pages.

"Mule Digital Signature Processor", Retrieved from: https://web.archive.org/web/20201001132209/https:/docs.mulesoft.com/mule-runtime/3.9/mule-digital-signature-processor, Oct. 1, 2020, 28 Pages.

Kim, et al., "Reducing Payload Scans for Attack Signature Matching Using Rule Classification", In Proceeding of 13th Australasian Conference Information Security and Privacy, Jul. 2008, pp. 350-360.

Nikam, et al., "Securing MQTT protocol in IoT by payload Encryption Technique & Digital Signature", In Journal of Advanced Research in Applied Sciences, vol. 5, Issue 4, Aug. 2018, pp. 386-391.

Park, et al., "Software Architecture for a Lightweight Payload Signature-Based Traffic Classification System"; In Proceeding of Conference of Traffic Monitoring and Analysis—Third International Workshop, Apr. 2011, pp. 136-149.

\* cited by examiner

VALIDATION OF PAYLOAD FOR DEPLOYMENT TO A TARGET ENVIRONMENT

BACKGROUND

Computing systems are currently in wide use. Some computing systems host applications that are developed by build systems.

The hosted applications are deployed in computing system resource clusters (such as server and memory clusters) that can be arranged in different rings. For instance, when an application is first developed, or when an update is generated, the application or update may first be deployed to a test ring of clusters. In the test ring, the application or update may be tested, without compromising customer data. Once tested, the application or update may be deployed to a production ring of clusters in which the application or update is available to a limited set of customers. Once determined to have adequate performance, the application or update may then be generated to a wider production cluster in which the application or update is exposed to a wider set of customers.

The discussion above is merely provided for general background information and is not intended to be used as an aid in determining the scope of the claimed subject matter.

SUMMARY

A payload is generated by a build computing system. The payload includes payload identifying metadata and deployment target identifier metadata, as well as an application container that includes a set of signed binaries. The payload can be approved for deployment, and a token can be generated for the payload. The token may include a set of claims that include payload identifying information. A payload validation system validates the payload for deployment to a target environment using the payload identifying information.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

A build computing system often distributes a hosted application or update to a hosted application to various different data centers for use by clients. Those data centers may be located in geographically different locations. Each location may have multiple different clusters of computing resources (such as servers, memory space, etc.) that are used as capacity to run the applications and updates deployed at that location. The applications or updates are often included in payloads that are distributed for deployment at desired target locations in the different data centers.

Some current systems allow a client or user organization to approve of deployments that will affect the client data, prior to its deployment. The payload is provided to an access control computing system and identifies a target location where it is to be deployed. At the access control computing system the access of the payload to the client's data can be approved and otherwise controlled. The payload can be approved by either a manual or automatic approval system. Once approved, a token is then generated for the payload, indicating that the payload has been approved for deployment at the target location.

However, if a surreptitious user obtains a token, the surreptitious user may attach a separate payload to the token so it appears that the surreptitious payload is approved for deployment. Similarly, if a surreptitious user generates or obtains a token, the token may indicate that the surreptitious payload is approved for deployment at a location that is different than the location intended for deployment of the original payload.

The present description thus proceeds with respect to an access control computing system that can be used to generate a token for an approved payload. The token includes claims, one of which uniquely identifies the payload corresponding to the token. Another claim may identify the target environment where the payload is to be deployed. By validating these claims, the deployment system ensures that the token belongs to the corresponding payload and ensures that the payload is to be deployed in the particular target environment for which deployment has been requested. This type of validation can be repeated as the payload is deployed within different rings (e.g., a test ring, a production ring, etc.) of the clusters in the different data centers.

Figure 1:
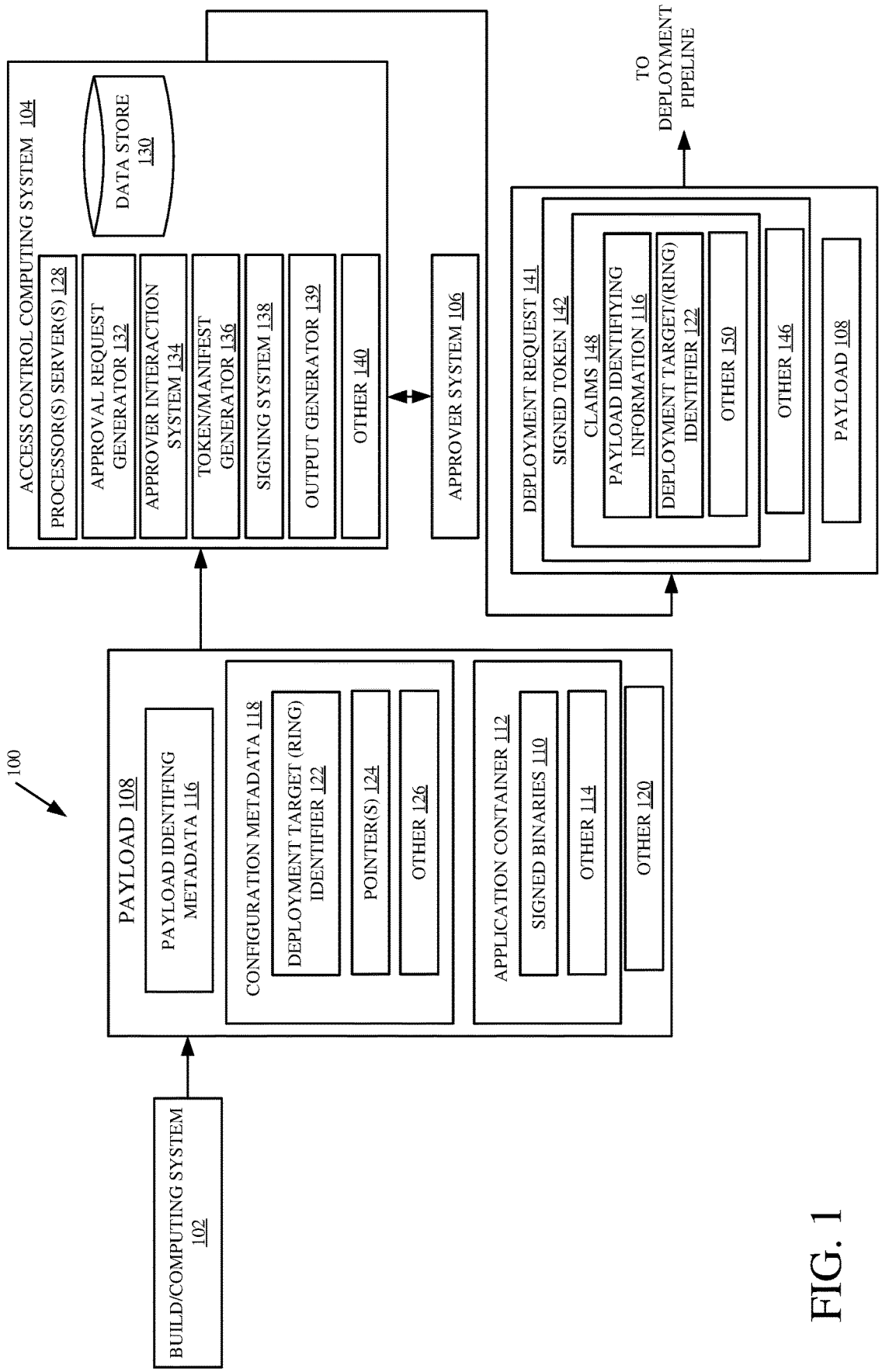
FIG. 1 is a block diagram of one example of a portion of a computing system architecture in which a build system generates a payload and provides it to an access control computing system for deployment approval and token generation.

FIG. 1 is a block diagram of a portion of a computing system architecture 100. Architecture 100, in the example shown in FIG. 1, includes build computing system 102, access control computing system 104, and approver system 106. Build computing system 102 is illustratively used to generate an application or update or another set of code that is to be deployed in a data center. In the example illustrated in FIG. 1, the application or update is included in a payload 108. For instance, the application or update can be embodied as one or more signed binaries 110 (which can be signed by the build computing system 102 or in other ways) in an application container 112 of payload 108. The application container 112 can include other items 114 as well.

Payload 108 can also include payload identifying metadata 116, and configuration metadata 118, as well as other items 120. The payload identifying metadata 116 is illustratively metadata that uniquely identifies the contents of application container 112. For instance, the payload identifying metadata 116 may be a hash value that is generated by hashing the signed binaries 110 in application container 112. The payload identifying metadata 116 can be other identifying metadata that uniquely identifies the signed binaries 110 as well.

Configuration metadata 118 illustratively includes metadata that indicates how to configure and run the signed binaries 110 or other contents of application container 112. For instance, configuration metadata 118 may include deployment target (ring) identifier information 122. Information 122 identifies a target environment where the signed binaries 110 are to be deployed. The target environment may be a ring (which may be a subset of clusters of computing system resources) at a particular data center or other computing system. Configuration metadata 118 may also include one or more pointers 124 and additional information 126 which indicates which particular binaries to load and run, how to configure them, etc.

In the example shown in FIG. 1, build computing system 102 provides payload 108 to access control computing system 104. Computing system 104 allows clients to control (or approve) requests for access to their client data. For instance, computing system 104 may provide a mechanism by which deployment of payload 108 can be approved or rejected. Computing system 104 also generates validation data so the payload 108 and the approval can be validated prior to deployment.

By way of example, computing system 104 controls interaction with an approver system 106 which can be used to obtain approval for deployment of payload 108. Computing system 104 may also generate a token (and/or manifest) that includes claims that can be used by control functionality (e.g., a control plane) at the target environment to validate the payload 108. In the example shown in FIG. 1, computing system 104 illustratively includes one or more processors or servers 128, data store 130, approval request generator 132, approver interaction system 134, token/manifest generator 136, signing system 138, output generator 139, and computing system 104 can include other items 140 as well.

Approval request generator 132 identifies the type of approval that will be needed for payload 108 to be deployed at the target environment. For instance, where the deployment target identifier 122 in the configuration metadata 118 of payload 108 indicates that payload 108 is to be deployed in a test ring, approval request generator 132 may determine that automated approval is sufficient. However, if deployment target identifier 122 in payload 108 indicates that payload 108 is to be deployed in a production ring in which the deployed payload will have wide access to user data, then approval request generator 132 may determine that the request for deployment of the payload 108 must be provided to a human approver system 106 for human approval.

Approver interaction system 134 handles the interaction between computing system 104 and approver system 106, whichever approver system 106 is identified by approval request generator 132. Approval request generator 132 thus generates an approval request and approver interaction system 134 provides that approval request to the identified approver system 106 and handles approval interactions with that approver system 106.

Once deployment of the payload 108 is approved, token/manifest generator 136 generates a token corresponding to the approved payload 108. The token may include a manifest that, itself, includes a set of claims that are used by the control functionality at the target environment to validate the payload 108 for deployment in the target environment.

Signing system 138 then signs the token. In one example, singing system 138 uses a public key validation system to sign the token and the approved payload. Signing system 138 uses a trusted signer, and trust can be verified by a certificate chain that is included in token 142. The trust is verified by ensuring that the root of the certificate chain corresponds to a Trusted Certificate Authority. Different deployment environments may have different trusted signers. This thus provides cryptographic assurance that deployment to those environments (such as sovereign clouds, government clouds, etc.) are approved by the correct instance of access control computing system 104, based on the compliance and security requirements of those environments. Output generator 139 in computing system 104 then outputs the signed token 142, which may include manifest 144 and other items 146. In the example shown in FIG. 1, manifest 144 includes a set of claims 148 which, themselves, include the payload identifying metadata 116 and the deployment target (ring) identifier 122 (or claims derived from metadata 116 and identifier 122.) Claims 148 can include other items 150 as well. Similarly, manifest 144 can include other items 152. The payload 108 with the corresponding signed token 142 is output by output generator 139 as deployment request 141 which is provided to a deployment pipeline.

Figure 2:
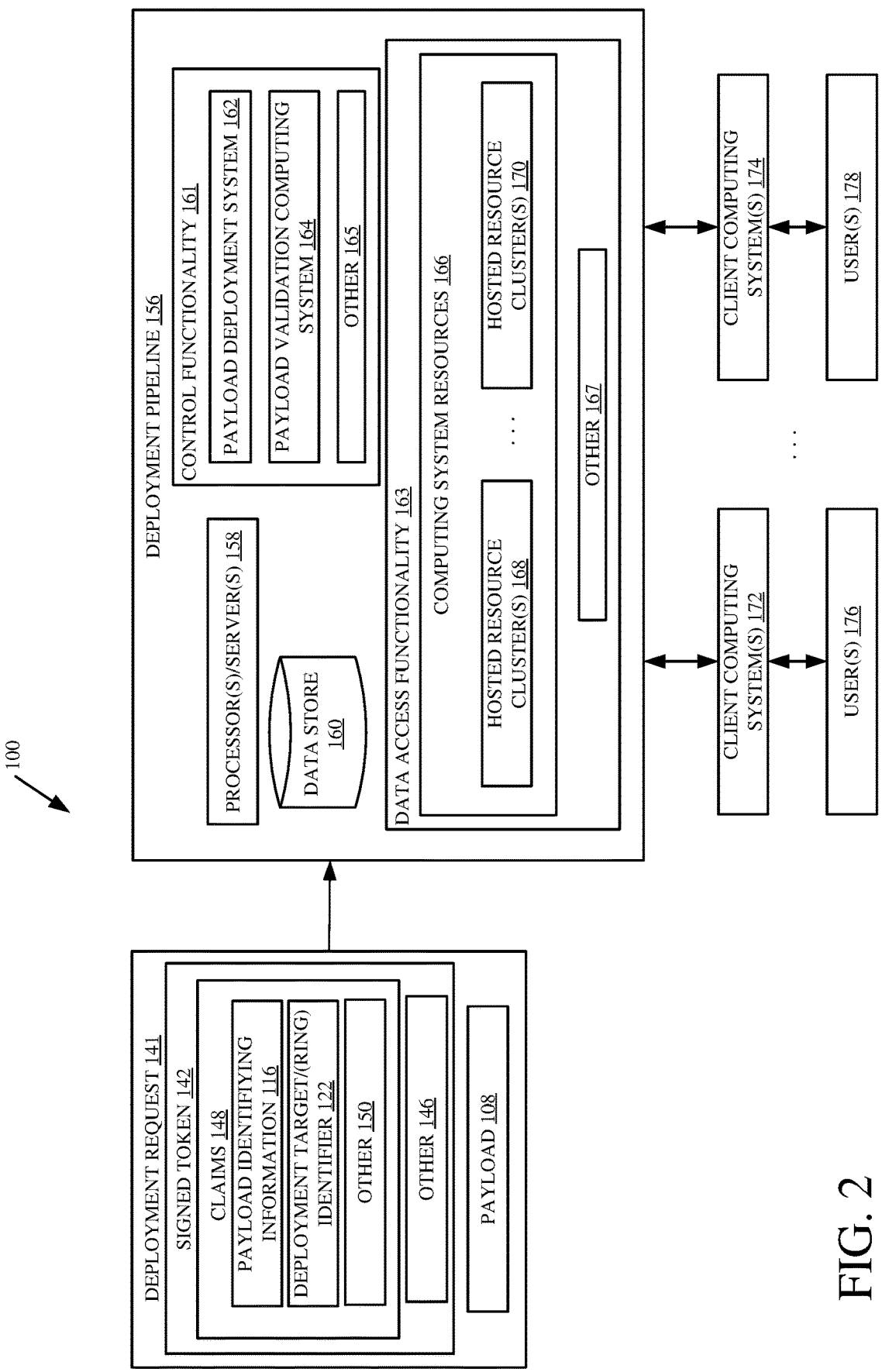
FIG. 2 is a block diagram showing one example of a portion of the computing system architecture in which a signed token and corresponding payload are provided to a deployment pipeline for validation and deployment.

FIG. 2 shows one example of a block diagram illustrating additional portions of computing system architecture 100. Some items in FIG. 2 are similar to those shown in FIG. 1, and they are similarly numbered. FIG. 2 shows that the signed token 142, along with payload 108 are provided to deployment pipeline 156. Deployment pipeline 156 may include one or more processors or servers 158, data store 160, control functionality (or a control plane) 161 and data access functionality (or a data plane) 163. Deployment pipeline 156 can include other items as well. The control functionality 161 is used to deploy and configure code that is used by client computing systems 172-174 to access client data. The data access functionality 163 is then used by users 176-178 to access the data and to access user functionality implemented by the code. Therefore, in one example, control functionality 161 may include a payload deployment system 162, payload validation computing system 164, and other items 165. Data access functionality 163 may include a set of computing system resources 166 that run the code for users, as well as other items 167. Computing system resources 166 can be divided into a plurality of different hosted resource clusters 168-170. The hosted clusters 168-170 can be arranged in rings. For instance, resource cluster(s) 168 can be a test ring, while resource cluster(s) 170 can be a production ring. These rings are examples only. The resource clusters 168-170 in deployment pipeline 156 can be accessed by a plurality of different client devices 172-174 which, themselves, can be accessed and manipulated by different sets of users 176-178. The client devices 172-174 may belong to different tenants (wherein a tenant may be an organization) with tenant-based users. The different tenants may have access to different resource clusters 168-170 in the deployment pipeline 156 so that the data for different tenants remains separate.

Deployment target identifier 122 identifies the particular ring or resource cluster 168-170 where payload 108 is to be deployed by payload deployment system 162. However, before deploying payload 108 to the identified target environment or target resource cluster, payload validation computing system 164 validates the payload 108. Payload validation computing system 164 is described in greater detail below. Briefly, in one example, payload validation computing system 164 first validates the signature on token 142 to ensure that the token 142 has not been tampered with. System 164 can also verify that the signature has been produced by a trusted signer based on the root of the certificate chain and the environment where the target cluster is located. System 164 then uses payload identifying information 116 to ensure that signed token 142 is the token that was generated for this specific payload 108. Payload validation computing system 164 also validates that the target resource cluster for which deployment request 141 is requesting deployment of payload 108 is the same target cluster identified by deployment target identifier 122. In this way, payload validation computing system 164 ensures that the signed token 142 was generated for this particular payload 108, and that this particular payload 108 was approved by approver system 106 for deployment in the identified target resource cluster.

Once the payload has been validated by payload validation computing system 164, then payload deployment system 162 deploys payload 108 in the identified resource cluster (identified by the deployment target identifier 122) so that the code in payload 108 can be accessed by the corresponding users or tenants 176-178, using the corresponding user or tenant systems 172-174.

Figure 3:
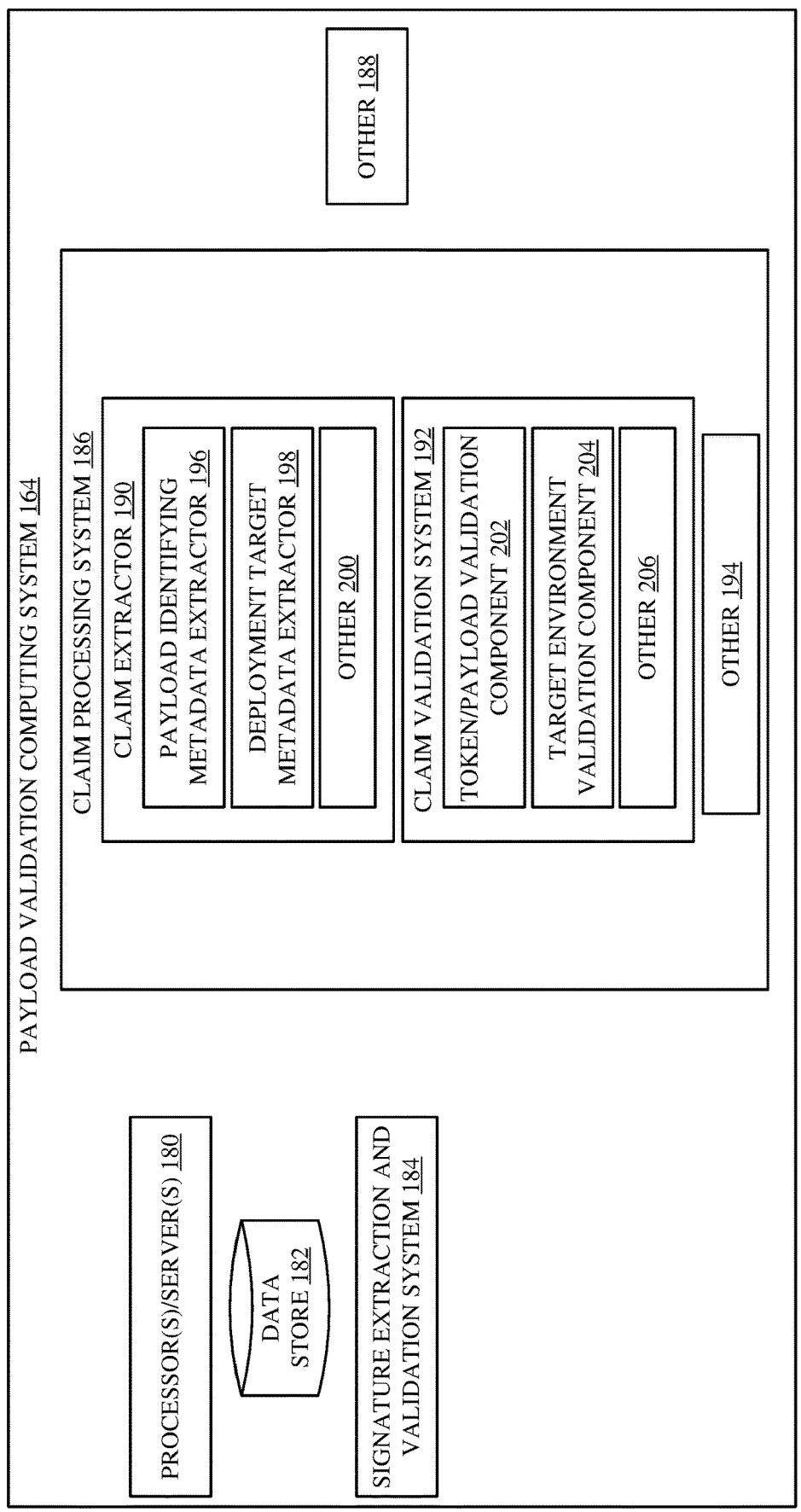
FIG. 3 is a block diagram showing one example of a payload validation computing system in more detail.

FIG. 3 is a block diagram showing one example of payload validation computing system 164 in more detail. Payload validation computing system 164, in the example shown in FIG. 3, may include one or more processors or servers 180, data store 182, signature extraction and validation system 184, and claim processing system 186. System 164 can include other items 188 as well. Claim processing system 186 includes claim extractor 190, claim validation system 192, and other items 194. Claim extractor 190 illustratively includes payload identifying metadata extractor 196, deployment target metadata extractor 198, and other items 200. Claim validation system 192 illustratively includes token/payload validation component 202, target environment validation component 204, and other items 206. Before describing the overall operation of computing system architecture 100 and payload validation computing system 164 in more detail, a brief description of some of the items in payload validation system 164, and their operation, will first be provided.

Signature extraction and validation system 184 is illustratively a public key signature validation system which may validate the signature on token 142 in a way that is similar to validating a certificate. For instance, signature extraction and validation system 184 may impose a constraint that the signature on token 141 have a property indicating that it was issued uniquely for singing this particular token 141 or this particular payload 108. System 184 can use public key validation or other types of validation.

Claim processing system 186 then processes the various claims 148 in manifest 144 of token 142. Claim extractor 190 first extracts the claims from token 142 that are used to validate token 142 and payload 108 and claim validation system 192 performs validation using the extracted claims. Therefore, in one example, payload identifying metadata extractor 196 extracts the payload identifying metadata or payload identifying information 116 from claims 148. Deployment target metadata extractor 198 extracts the deployment target identifier 122 from claims 148. The extracted claims are then provided from claim extractor 190 to claim validation system 192. Token/payload validation component 202 validates payload 108 by ensuring that the payload identifying metadata extractor 196 uniquely identifies the payload 108 corresponding to the signed token 142 in deployment request 141. For instance, where the payload identifying information 116 is a hash value generated by hashing payload 108, then token/payload validation component 202 hashes payload 108 and matches the hash value generated from that hashing operation to the payload identifying information 116 which was extracted by payload identifying metadata extractor 196 as a claim 148 in token 142. If the two values match, then token/payload validation component 202 generates an output indicating that the token 142 does indeed correspond to the payload 108. This validates that this token 142 was in fact generated for this payload 108.

Target environment validation component 204 then validates that the deployment request 141 is requesting that payload 108 be deployed to the same target environment (or target resource) as is indicated by deployment target identifier 122. This ensures that the approver system 106 approved the deployment of this payload 108 to the requested target environment that is requested in deployment request 141.

Figure 4:
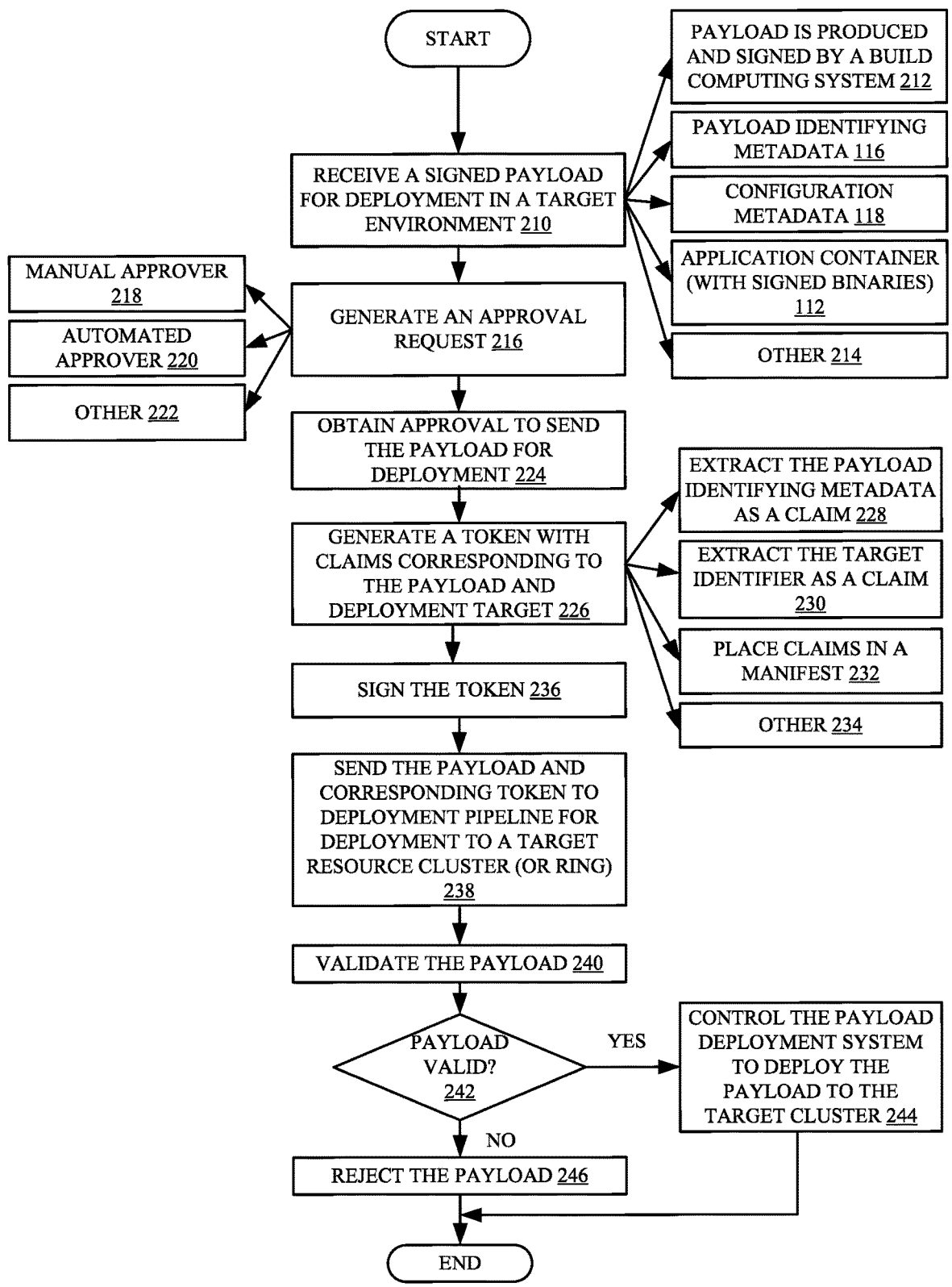
FIG. 4 is a flow diagram illustrating one example of the overall operation of the computing system architectures illustrated in FIGS. 1-3.

FIG. 4 is a flow diagram illustrating one example of the operation of architecture 100 (shown in FIGS. 1 and 2) in validating and deploying (or rejecting the deployment of) payload 108 in a target environment. It is first assumed that access control computing system 104 receives a signed payload for deployment at a target environment. Receiving the signed payload is indicated by block 210 in the flow diagram of FIG. 4. As discussed above, payload 108 can be produced and signed by a build computing system 102, as indicated by block 212 in the flow diagram of FIG. 4. The payload can include payload identifying information or metadata 116 as well as configuration metadata 118. Configuration metadata 118 can, itself, include deployment target identifier 122 which identifies the target environment (or target resource cluster(s) or ring(s)) where the payload 108 is to be deployed, and other items. payload 108 can also include application container 112 with signed binaries 110 and other items 214.

Once payload 108 is received at access control computing system 104, approval request generator 132 generates an approval request. Generating an approval request is indicated by block 216 in the flow diagram of FIG. 4. For instance, approval request generator 132 can access the deployment target identifier 122 to determine the target environment for payload 108. The approver system 106 that is used to approve the deployment of payload 108 may vary based upon the target environment. For instance, if the target environment is a test environment (or test ring), then the approver system 106 may be an automated approval system whereas if the target environment is a production environment (or production ring), then approver system 106 may be a manual approval system. Generating an approval request for a manual approver is indicated by block 218, and generating an approval request for an automated approver is indicated by block 220. The approval request can be generated in other ways as well, as indicated by block 222.

Based upon the approver system 106 that is to be used, approval request generator 132 generates a request to that system and approver interaction system 134 handles interaction between access control computing system 104 and the selected approver system 106. Thus, system 134 can provide payload 108 to the selected approver system 106 and conduct any other interactions to obtain approval for deployment of payload 108 at the identified target environment. The approver system 106 illustratively provides approval for the deployment of payload 108 at the identified target environment. Obtaining approval to send the payload 108 for deployment is indicated by block 224 in the flow diagram of FIG. 4.

Once approval is received, token/manifest generator 136 generates a token with claims corresponding to the payload 108 and the target environment in which payload 108 is to be deployed. Generating a token with claims corresponding to the payload and deployment target is indicated by block 226 in the flow diagram of FIG. 4. Token/manifest generator 136 extracts the payload identifying metadata 116 as a claim, as indicated by block 228. System 136 also extracts the deployment target identifier 122 as a claim, as indicated by block 230. In one example, token/manifest generator 136 places the claims in a manifest 144, as indicated by block 232 in the flow diagram of FIG. 4. The token, along with the claims, can be generated in other ways as well, as indicated by block 234.

Signing system 138 then signs the token, as indicated by block 236. Again, signing the token can be done using a public key, a certificate-based system, or in other ways.

Access control computing system 104 then sends the payload 108 and corresponding signed token 142, as a deployment request 141, to the deployment pipeline 156 for deployment to a target resource cluster or ring in computing system resources 166. Sending the payload 108 and corresponding token 142 to the deployment pipeline 156 for deployment is indicated by block 238 in the flow diagram of FIG. 4.

Before payload deployment system 162 deploys the payload to the target computing system resources 166 as part of the data access functionality 163, the control functionality 161 processes the deployment request 141. Payload validation computing system 164 validates the payload 108. Validating the payload 108 is indicated by block 240 in the flow diagram of FIG. 4. Payload validation computing system 164 generates a payload validation output indicative of whether payload 108 is validated for deployment. If the payload 108 is valid, as indicated by block 242 in FIG. 4, then payload deployment system 162 is controlled to deploy the payload 108 to the target cluster or target environment, as indicated by block 244. However, if, at block 242, payload validation computing system 164 determines that the payload 108 is not valid, then the payload 108 is rejected, and is not deployed, as indicated by block 246. When the payload 108 is rejected, a corresponding message can be sent to another system (such as build system 102, approver system 106, or another system), indicating that the payload 108 has been rejected.

Figure 5:
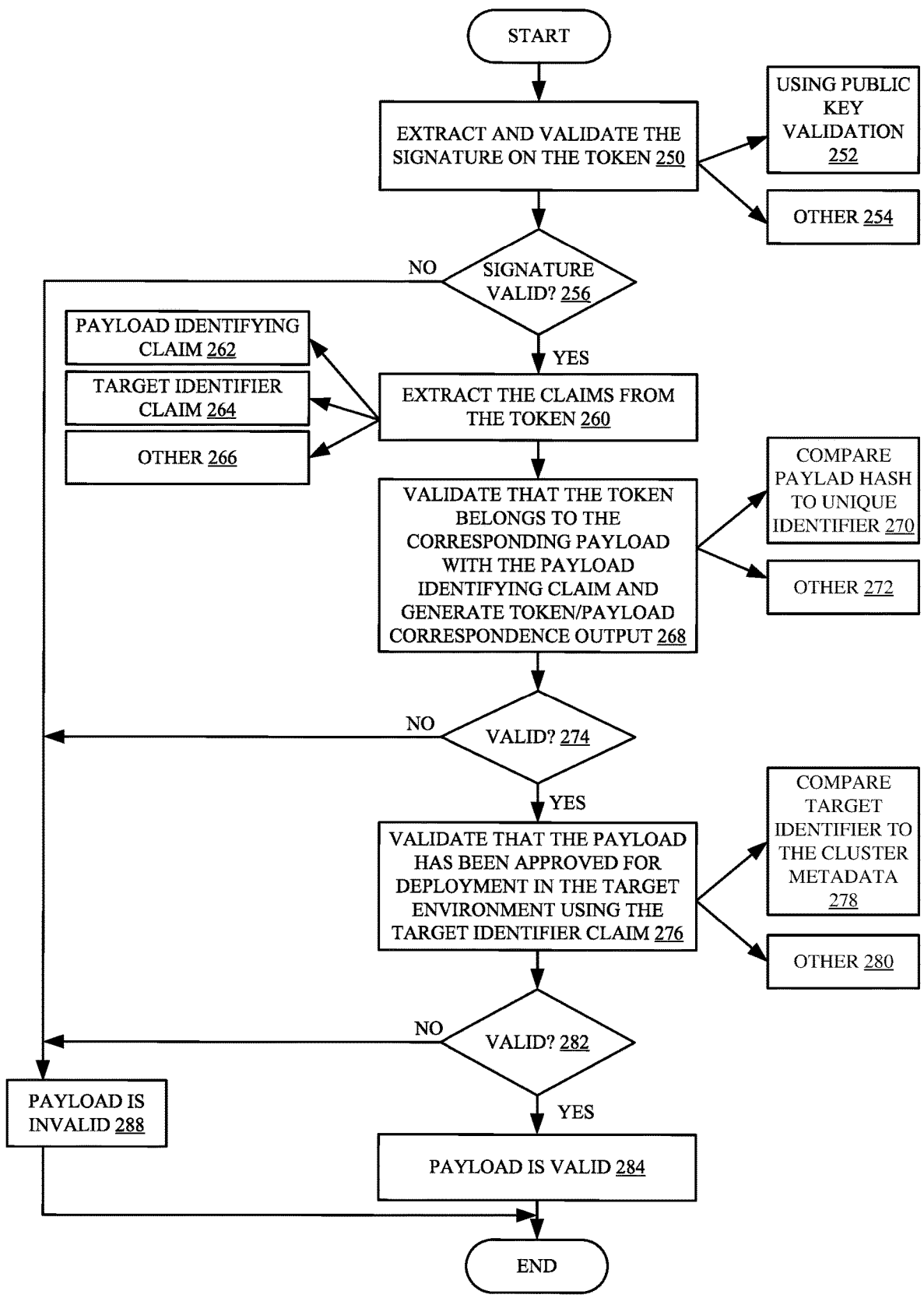
FIG. 5 is a flow diagram illustrating one example of the operation of a payload validation computing system, in more detail.

FIG. 5 is a flow diagram illustrating one example of the operation of payload validation computing system 164 in validating payload 108 prior to is deployment. Signature extraction and validation system 184 first extracts and validates the signature on the signed token 142. Extracting and validating the signature on the token is indicated by block 250 in the flow diagram of FIG. 5. The signature can be validated using public key validation 252 or other validation techniques 254.

If the signature on token 142 is not valid, as determined at block 256, then the payload is identified as being invalid, as indicated by block 258 in the flow diagram of FIG. 5. However, if, at block 256, signature extraction and validation system 184 determines that the signature is valid, then claim extractor 190 extracts the claims 148 from the token 142. Extracting the claims from the token is indicated by block 260 in the flow diagram of FIG. 5. Payload identifying metadata extractor 196 can extract the payload identifying claim, as indicated by block 262. Deployment target metadata extractor 198 can extract the target identifier claim, as indicated by block 264. Other claims can be extracted as well, as indicated by block 266.

Token/payload validation component 202 then validates that the token 142 corresponds to (or was specifically generated for) this payload 108, by using the payload identifying claim, as indicated by block 268 in the flow diagram of FIG. 5. Token/payload validation component 202 can ensure that the token 142 was generated for this specific payload 108 by comparing, for instance, a hash value generated by hashing payload 108, with the payload identifying information which, itself, may be a hash value of payload 108 that was generated by build computing system 102 or another system. Comparing the payload hash to the unique identifier is indicated by block 270 in the flow diagram of FIG. 5. Validating the token as belonging to the corresponding payload 108 can be done in other ways as well, as indicated by block 272. This reduces the likelihood that a surreptitious user obtained a token and then attached a surreptitious payload to that token.

If token/payload validation component 202 is unable to ensure that the token 142 corresponds to the payload 108, as indicated by block 274 in the flow diagram of FIG. 5, then token/payload validation component 202 generates a token/payload correspondence output indicating that the payload 108 is invalid, as indicated by block 258.

However, if, at block 274, token/payload validation component 202 determines that the token 142 does correspond to this specific payload 108, then token/payload validation component 202 generates a token/payload correspondence output indicating that this token 142 corresponds to this specific payload 108. Target environment validation component 204 then validates whether the payload 108 has been approved for deployment in the target environment, using the target identifier claim, as indicated by block 276 in the flow diagram of FIG. 5. In one example, target environment validation component 204 obtains identifying information identifying the resource cluster (e.g., resource cluster 168) which is the target of the deployment request 141 for payload 108. Target environment validation component 204 compares that cluster identifying information with the deployment target identifier 122 from the signed token 142 to determine whether the two are the same. Comparing the target identifier claim to the cluster identifying metadata is indicated by block 278 in the flow diagram of FIG. 5. If the two are the same, then the resource cluster for which deployment of payload 108 has been requested is the same as the resource cluster for which deployment of payload 108 was approved by approver system 106. That is, deployment request 141 is requesting that payload 108 be deployed to the same resource cluster (the requested target resource cluster) that it was approved for (and that is identified by the target identifier claim). Validating that the payload has been approved for deployment in the target environment can be done in other ways as well, as indicated by block 280 in the flow diagram of FIG. 5.

If target environment validation component 204 is able to validate that the requested target environment is the same as the approved target environment, then payload validation computing system 164 generates an output indicating that payload 108 has been validated for deployment at the target environment, as indicated by block 284. Again, however, if target environment validation component 204 is unable to validate that the target environment is the same as the environment for which deployment was approved, then the payload is marked as being invalid, as indicated by block 258.

It can thus be seen that the present description describes a system in which a signed payload that is generated by a build computing system can be securely deployed in a resource cluster (or ring) of a deployment pipeline. Once approval for the deployment has been obtained, the present system generates a token with claims that uniquely identify the payload to which the token belongs, and the target environment for which deployment of the payload has been approved. Thus, once the payload and token are received at the control functionality of the deployment pipeline, it can be validated that the requested target environment is the same as that for which deployment was approved for the payload, and that the token, itself, is the token that was generated for this precise payload. This inhibits a surreptitious user from attempting to deploy a surreptitious payload using a stolen or otherwise surreptitiously obtained token. It also inhibits a surreptitious user from being able to deploy a payload to a target environment, other than a target environment for which the payload has been approved.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

The present discussion has mentioned processors and servers. In one example, the processors and servers include computer processors with associated memory and timing circuitry, not separately shown. The processors and servers are functional parts of the systems or devices to which they belong and are activated by, and facilitate the functionality of the other components or items in those systems.

Also, a number of user interface (UI) displays have been discussed. The UIs can take a wide variety of different forms and can have a wide variety of different user actuatable input mechanisms disposed thereon. For instance, the user actuatable input mechanisms can be text boxes, check boxes, icons, links, drop-down menus, search boxes, etc. The mechanisms can also be actuated in a wide variety of different ways. For instance, they can be actuated using a point and click device (such as a track ball or mouse). The mechanisms can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, the mechanisms can be actuated using touch gestures. Also, where the device that displays them has speech recognition components, they can be actuated using speech commands.

A number of data stores have also been discussed. It will be noted the data stores can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 6:
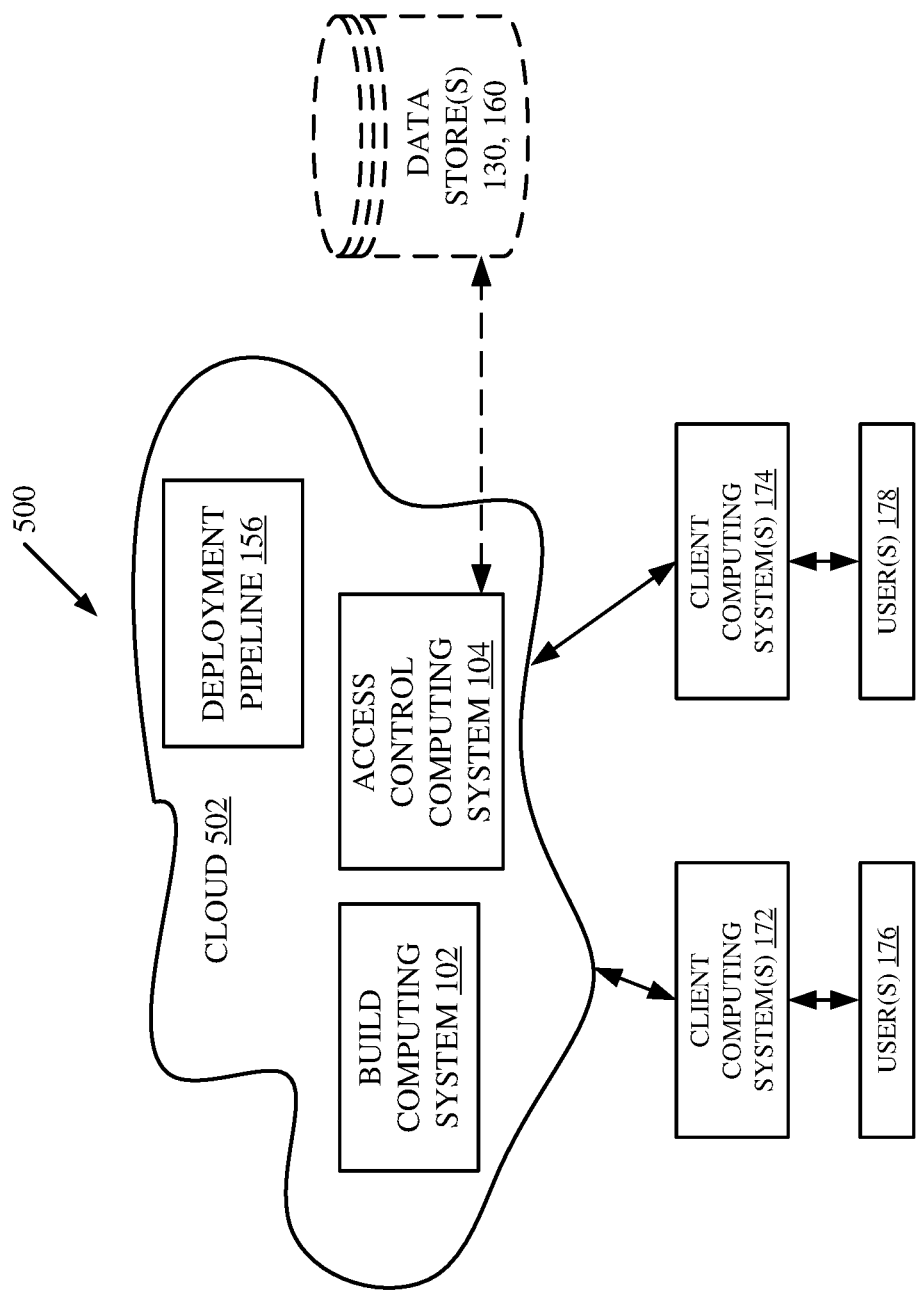
FIG. 6 is a block diagram showing one example of the computing system architecture illustrated in FIGS. 1-3, deployed in a cloud computing architecture.

FIG. 6 is a block diagram of items illustrated in architecture 100, shown in FIGS. 1 and 2, except that its elements are disposed in a cloud computing architecture 500. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the example shown in FIG. 6, some items are similar to those shown in FIGS. 1 and 2 and they are similarly numbered. FIG. 6 specifically shows that build computing system 102, access control computing system 104, and deployment pipeline 156 can be located in cloud 502 (which can be public, private, or a combination where portions are public while others are private). Therefore, users 176-178 use user devices with client computing systems 172-174 to access those systems through cloud 502.

FIG. 6 also depicts another example of a cloud architecture. FIG. 6 shows that it is also contemplated that some elements of computing system architecture 100 can be disposed in cloud 502 while others are not. By way of example, data stores 130, 160 can be disposed outside of cloud 502, and accessed through cloud 502. In another example, other items can be outside of cloud 502. Regardless of where they are located, the items can be accessed directly by the client systems through a network (either a wide area network or a local area network), they can be hosted at a remote site by a service, or the items can be provided as a service through a cloud or accessed by a connection service that resides in the cloud. All of these architectures are contemplated herein.

It will also be noted that architecture 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 7:
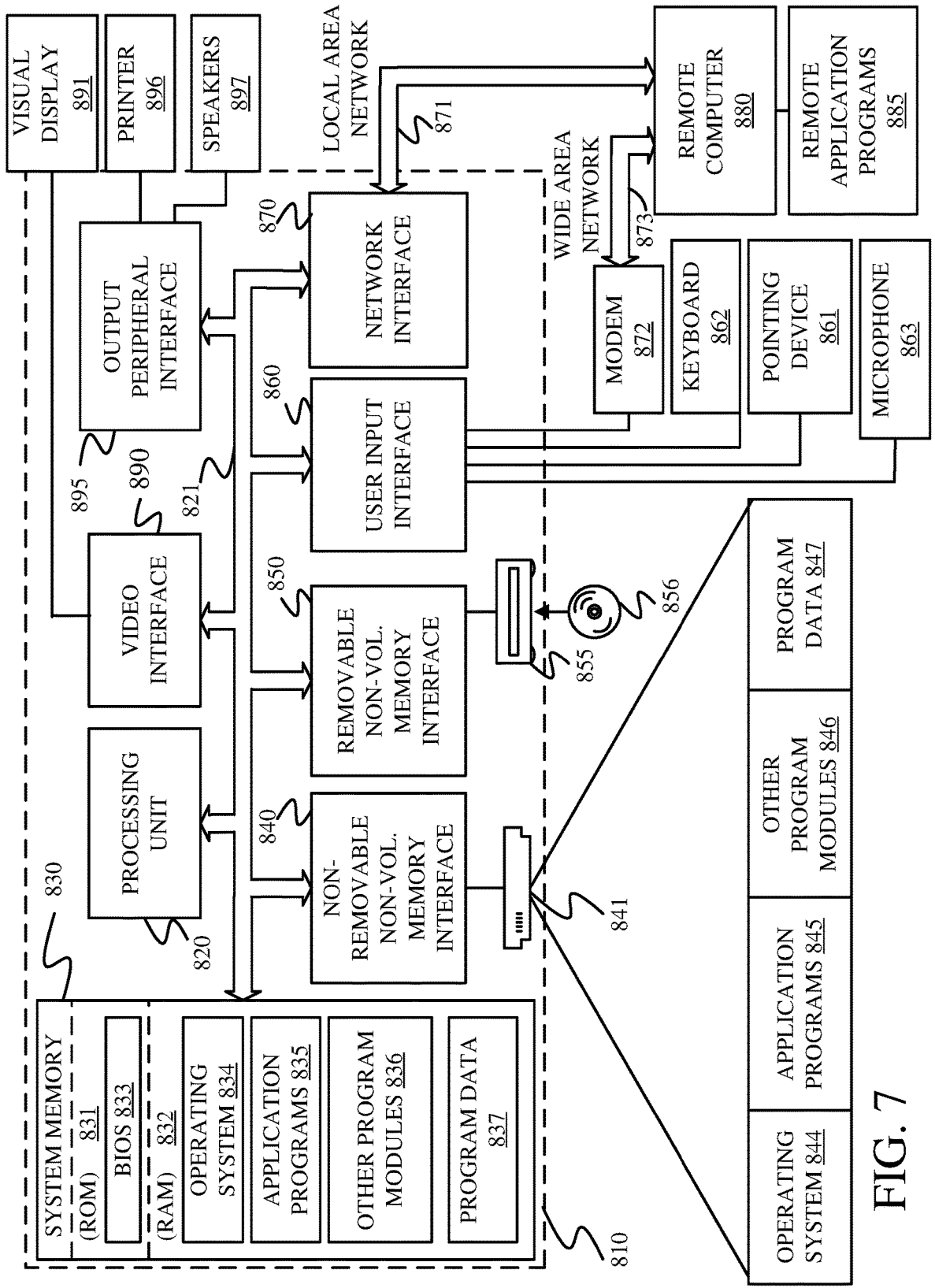
FIG. 7 is a block diagram showing one example of a computing environment that can be used in the architectures illustrated in the previous figures, or in other architectures.

FIG. 7 is one example of a computing environment in which architecture 100, or parts of it, (for example) can be deployed. With reference to FIG. 7, an example system for implementing some embodiments includes a computing device in the form of a computer 810 programmed to operate as set out above. Components of computer 810 may include, but are not limited to, a processing unit 820 (which can comprise processors or servers from previous FIGS.), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIGS. 1 and 2 can be deployed in corresponding portions of FIG. 7.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 7 illustrates operating system 834, application programs 835, other program modules 836, and program data 837.

The computer 810 may also include other removable/non-removable volatile/nonvolatile computer storage media. By way of example only, FIG. 7 illustrates a hard disk drive 841 that reads from or writes to non-removable, nonvolatile magnetic media, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 7, provide storage of computer readable instructions, data structures, program modules and other data for the computer 810. In FIG. 7, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 7 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 7 illustrates remote application programs 885 as residing on remote computer 880. It will be appreciated that the network connections shown are exemplary and other means of establishing a communications link between the computers may be used.

It should also be noted that the different examples described herein can be combined in different ways. That is, parts of one or more examples can be combined with parts of one or more other examples. All of this is contemplated herein.

Example 1 is a computer implemented method, comprising:
receiving a payload for deployment to a target resource cluster, the payload including application code and payload identifying metadata uniquely identifying the application code;
generating a payload identifying claim based on the payload identifying metadata;
generating a token corresponding to the payload, the token including the payload identifying claim;
signing the token to obtain a signed token; and
outputting the signed token to a deployment system for deployment to the target resource cluster.

Example 2 is the computer implemented method of any or all previous examples wherein the payload includes a deployment target identifier identifying the target resource cluster, and further comprising:
identifying an approver system for approving deployment of the payload to the target resource cluster based on the deployment target identifier; and
generating an approval request to the identified approver system.

Example 3 is the computer implemented method of any or all previous examples wherein generating a payload identifying claim comprises:
generating a unique identifier that uniquely identifies the application code based on the payload identifying metadata.

Example 4 is the computer implemented method of any or all previous examples wherein the payload includes a deployment target identifier identifying the target resource cluster, and further comprising:
generating a deployment target identifier claim based on the deployment target identifier.

Example 5 is the computer implemented method of any or all previous examples wherein generating a token comprises:
generating the token to include the deployment target identifier claim.

Example 6 is the computer implemented method of any or all previous examples and further comprising:
signing the token with a signature.

Example 7 is a computer implemented method, comprising:
receiving, at a deployment system, a payload for deployment and a token, wherein the payload includes application code to be deployed to a target resource cluster and wherein the token includes a payload identifying claim;
determining whether the payload identifying claim identifies the application code included in the payload;
generating a token/payload correspondence output indicating whether the payload identifying claim identifies the application code included in the payload;
generating a payload validation output indicating whether the payload is validated based at least in part on the token/payload correspondence output; and
controlling the deployment system to deploy the payload to a target resource cluster based on the payload validation output.

Example 8 is the computer implemented method of any or all previous examples wherein the payload identifying claim comprises a hash value and wherein determining whether the payload identifying claim identifies the application code included in the payload comprises:
hashing the application code in the payload to obtain a code hash value; and
comparing the code hash value to the hash value.

Example 9 is the computer implemented method of any or all previous examples wherein receiving a payload and a token comprises:
receiving a deployment request requesting deployment of the payload to a requested target resource cluster identified by a requested target resource identifier.

Example 10 is the computer implemented method of any or all previous examples wherein the token includes a deployment target identifier claim identifying a resource cluster and further comprising:
comparing the requested target resource identifier to the deployment target identifier claim.

Example 11 is the computer implemented method of any or all previous examples wherein generating the payload validation output comprises:
generating the payload validation output based at least in part on whether the requested target resource identifier matches the deployment target identifier claim.

Example 12 is the computer implemented method of any or all previous examples wherein the token is signed with a signature and further comprising:
validating the signature on the token; and
generating a signature validation output based on validation of the signature.

Example 13 is the computer implemented method of any or all previous examples wherein controlling the deployment system comprises:
controlling the deployment system to deploy the payload to the target resource cluster based on the payload validation output and the signature validation output.

Example 14 is a computing system, comprising:
a processor; and
a data store that has computer executable instructions which, when executed by the processor, cause the processor to implement computing system components, comprising:
a token generator that receives a payload that includes application code to be deployed to a target resource cluster and payload identifying metadata uniquely identifying the application code, the token generator generating a token corresponding to the payload with a payload identifying claim based on the payload identifying metadata;
a signing system that signs the token with a signature; and
an output generator that generates a deployment request including the signed token and the payload, requesting deployment of the payload to the target resource cluster.

Example 15 is the computing system of any or all previous examples wherein the payload includes a deployment target identifier identifying the target resource cluster, and further comprising:

an approval request generator identifying an approver system for approving deployment of the payload to the target resource cluster based on the deployment target identifier and generating an approval request to the identified approver system.

Example 16 is the computing system of any or all previous examples wherein the token generator is configured to generate the payload identifying claim by generating a unique identifier that uniquely identifies the application code based on the payload identifying metadata.

Example 17 is the computing system of any or all previous examples wherein the payload includes a deployment target identifier identifying the target resource cluster, and wherein the token generator is configured to generate a deployment target identifier claim based on the deployment target identifier.

Example 18 is the computing system of any or all previous examples wherein the token generator is configured to generate the token to include the deployment target identifier claim.

Example 19 is the computing system of any or all previous examples and further comprising:

a claim, processing system configured to determine whether the payload identifying claim identifies the application code included in the payload and to generate a token/payload correspondence output indicating whether the payload identifying claim identifies the application code included in the payload and to further generate a payload validation output indicating whether the payload is validated based at least in part on the token/payload correspondence output.

Example 20 is the computing system of any or all previous examples and further comprising:

a target environment validation component configured to comparing the requested target resource identifier to the deployment target identifier claim and to generate the payload validation output based at least in part on whether the requested target resource identifier matches the deployment target identifier claim.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method performed by a computing system, the method comprising:
   receiving a payload including;
      a first payload portion having application code configured to be deployed to a target resource cluster,
      a second payload portion having payload identifying metadata uniquely identifying the application code in the first payload portion, and
      a deployment target identifier that identifies the target resource cluster;
   generating a token corresponding to the payload based on the payload identifying metadata, the token including:
      a payload identifying claim having a unique identifier that uniquely identifies the application code, and
      a deployment target identifier claim based on the deployment target identifier;
   controlling a signing system to obtain a signed token by using a signature to electronically sign the token including the payload identifying claim and the deployment target identifier claim; and
   outputting a deployment request, including the signed token and the payload, requesting deployment of the payload to the target resource cluster.

2. The method of claim 1, and further comprising:
   identifying an approver system for approving deployment of the payload to the target resource cluster based on the deployment target identifier; and
   generating an approval request to the approver system.

3. The method of claim 1, comprising:
   receiving, at a deployment system, the deployment request including the signed token and the payload;
   determining whether the payload identifying claim identifies the application code included in the payload;
   generating a token/payload correspondence output indicating whether the payload identifying claim identifies the application code included in the payload;
   generating a payload validation output indicating whether the payload is validated based at least in part on the token/payload correspondence output; and
   controlling the deployment system to deploy the payload to the target resource cluster based on the payload validation output.

4. The method of claim 3 wherein the payload identifying claim comprises a hash value and wherein determining whether the payload identifying claim identifies the application code included in the payload comprises:
   hashing the application code in the payload to obtain a code hash value; and
   comparing the code hash value to the hash value.

5. The method of claim 3 wherein receiving the deployment request comprises:
   receiving the deployment request requesting deployment of the payload to a requested target resource cluster identified by a requested target resource identifier.

6. The method of claim 5 wherein the token includes a deployment target identifier claim identifying a resource cluster and further comprising:
   comparing the requested target resource identifier to the deployment target identifier claim.

7. The method of claim 6 wherein generating the payload validation output comprises:
   generating the payload validation output based at least in part on whether the requested target resource identifier matches the deployment target identifier claim.

8. The method of claim 7 wherein the token is signed with a signature and further comprising:
   validating the signature on the token; and
   generating a signature validation output based on validation of the signature.

9. The method of claim 8 wherein controlling the deployment system comprises:
   controlling the deployment system to deploy the payload to the target resource cluster based on the payload validation output and the signature validation output.

10. A computing system, comprising:
    a processor; and
    a data store that has computer executable instructions which cause the processor to implement computing system components, comprising:
       a token generator configured to:
          receive a payload that includes:
             a first payload portion having application code to be deployed to a target resource cluster, a second payload portion having payload identifying metadata uniquely identifying the application code and a deployment target identifier that identifies the target resource cluster; and generate a token corresponding to the payload based on the payload identifying metadata, the token including:

a payload identifying claim having a unique identifier that uniquely identities the application code, and a deployment target identifier claim based on the deployment target identifier;

a signing system configured to obtain a signed token by using a signature to electronically sign the token including the payload identifying claim and the deployment target identifier claim; and an output generator configured to generate a deployment request including the signed token and the payload, requesting deployment of the payload to the target resource cluster.

11. The computing system of claim 10 and further comprising:

an approval request generator identifying an approver system for approving deployment of the payload to the target resource cluster based on the deployment target identifier and generating an approval request to the approver system.

12. The computing system of claim 10 and further comprising:

a claim, processing system configured to determine whether the payload identifying claim identifies the application code included in the payload and to generate a token/payload correspondence output indicating whether the payload identifying claim identifies the application code included in the payload and to further generate a payload validation output indicating whether the payload is validated based at least in part on the token/payload correspondence output.

13. The computing system of claim 12 and further comprising:

a target environment validation component configured compare a requested target resource identifier to the deployment target identifier claim and to generate the payload validation output based at least in part on whether the requested target resource identifier matches the deployment target identifier claim.

\* \* \* \* \*